United States Patent
Digard Brou De Cuissart et al.

(10) Patent No.: US 8,147,205 B2
(45) Date of Patent: Apr. 3, 2012

(54) TURBOMACHINE BLADE

(75) Inventors: Sébastien Digard Brou De Cuissart, Paris (FR); Matthieu Le Ray, Le Perreux sur Marne (FR)

(73) Assignee: SNECMA, Paris (FR)

( * ) Notice: Subject to any disclaimer, the term of this patent is extended or adjusted under 35 U.S.C. 154(b) by 626 days.

(21) Appl. No.: 12/323,825

(22) Filed: Nov. 26, 2008

(65) Prior Publication Data

US 2009/0136352 A1 May 28, 2009

(30) Foreign Application Priority Data

Nov. 26, 2007 (FR) ...................................... 07 59295

(51) Int. Cl.
F01D 5/14 (2006.01)

(52) U.S. Cl. .................. 416/223 A; 415/115; 416/97 R; 416/236 R

(58) Field of Classification Search .................. 415/115; 416/97 R, 223 A, 236 R
See application file for complete search history.

(56) References Cited

U.S. PATENT DOCUMENTS

| | | | |
|---|---|---|---|
| 3,017,159 A | 1/1962 | Foster et al. | |
| 3,420,502 A | 1/1969 | Howald | |
| 3,885,609 A | 5/1975 | Frei et al. | |
| 4,515,523 A * | 5/1985 | North et al. | 415/115 |
| 5,368,441 A | 11/1994 | Sylvestro et al. | |
| 5,387,085 A * | 2/1995 | Thomas et al. | 416/97 R |
| 6,179,565 B1 * | 1/2001 | Palumbo et al. | 416/97 R |
| 7,121,787 B2 * | 10/2006 | Jacks et al. | 415/115 |
| RE39,398 E * | 11/2006 | Danowski et al. | 416/97 R |
| 2002/0187043 A1 * | 12/2002 | Liang | 416/97 R |
| 2005/0276697 A1 | 12/2005 | McGrath et al. | |
| 2006/0140762 A1 * | 6/2006 | Pietraszkiewicz et al. | 416/97 R |
| 2006/0222493 A1 | 10/2006 | Liang | |
| 2006/0269408 A1 * | 11/2006 | Liang | 416/97 R |
| 2009/0324422 A1 * | 12/2009 | Klasing et al. | 416/97 R |

FOREIGN PATENT DOCUMENTS

| | | |
|---|---|---|
| EP | 0 034 961 A1 | 9/1981 |
| EP | 1 013 882 A2 | 6/2000 |
| EP | 1 826 361 A2 | 8/2007 |
| GB | 679 931 | 9/1952 |

* cited by examiner

Primary Examiner — Asok Sarkar

(74) Attorney, Agent, or Firm — Oblon, Spivak, McClelland, Maier & Neustadt, L.L.P.

(57) ABSTRACT

The turbomachine blade has ribs formed in the vicinity of the trailing edge. Over the major fraction of the trailing edge (42), in zones where the temperature in operation is particularly high, the ends (53) of the ribs are closer to the trailing edge and/or the sections of the ribs (F) are greater.

Thereby, the design of the blade is optimized and the lifetime thereof is increased.

14 Claims, 2 Drawing Sheets

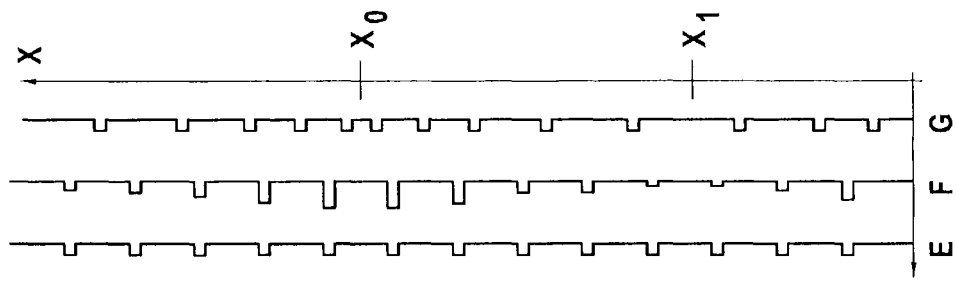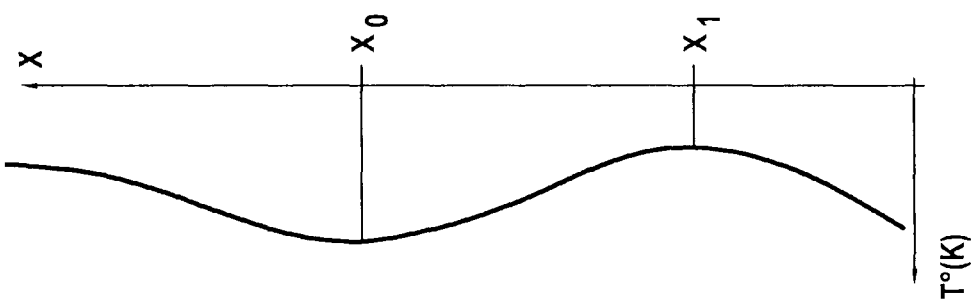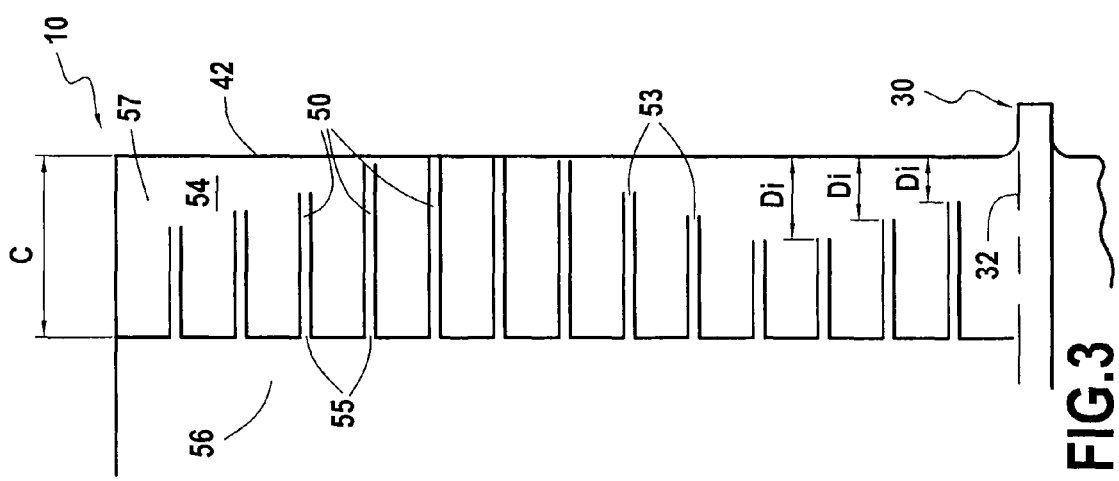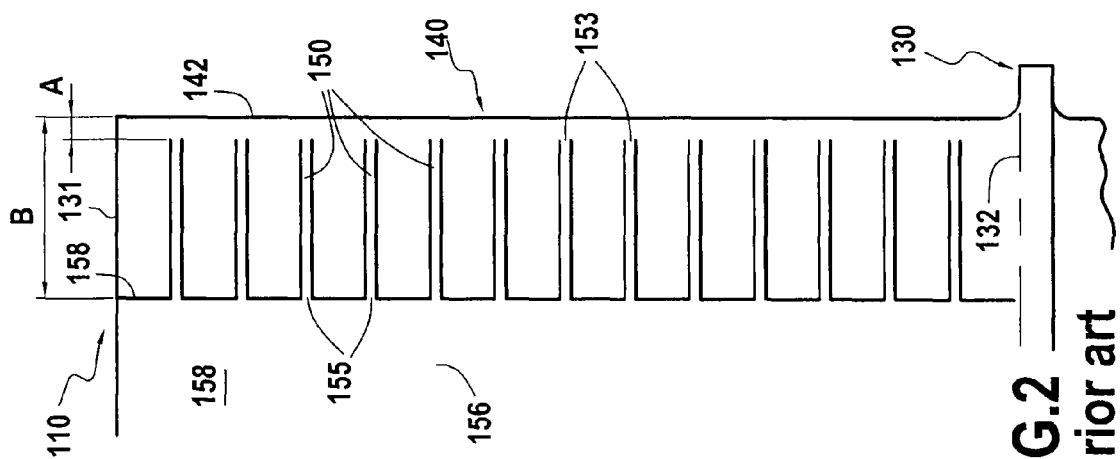

US 8,147,205 B2

TURBOMACHINE BLADE

FIELD OF THE INVENTION

The invention relates to a turbomachine blade, and mainly to a blade that is immersed in a stream of hot gas, requiring specific means to be implemented to enable it to operate in spite of difficult temperature conditions and often difficult pressure conditions. The turbomachine may be terrestrial, or it may be for aviation, e.g. a turbojet or a turboprop.

BACKGROUND OF THE INVENTION

In such a turbomachine, the blades are immersed in a stream of gas that flows at speeds that are sometimes high, e.g. at supersonic speeds. The temperatures to which the blades are subjected vary widely, and for aviation turbomachines typically over the range −50° C. to more than 1000° C. The blades are therefore subjected to pressure forces and to temperature gradients that are considerable.

Because of the high temperatures and the associated temperature gradients, considerable stresses appear within the blades. These stresses can lead to cracks appearing, in particular cracks localized in the trailing edges of the blades. Such cracks naturally require the blades to be replaced.

In order to enable the blades to have the strength to withstand these stresses, it is known to provide ribs in the vicinity of their trailing edges. These ribs serve to stiffen the trailing edge but without that leading to excessive extra thickness that would reduce the aerodynamic performance of the blade. In general, the ribs all terminate at substantially the same distance from the trailing edge.

With reference to FIG. 2, an example blade has ribs in the vicinity of its trailing edge organized in a known manner that is described below. FIG. 2 is a diagram showing the airfoil 140 of a blade 110. This blade has ribs 150 disposed along its trailing edge 142. These ribs 150 occupy positions extending from the platform 130 all the way to the opposite ends 131 of the airfoil 140. They are substantially parallel to the top face 132 of the platform, i.e. its face that faces towards the airfoil. The ends 153 of the ribs 150 situated in the vicinity of the trailing edge are all situated at the same distance A therefrom. Furthermore, the opposite ends 155 of the ribs situated remotely from the trailing edge, together with the step 158 formed between the main surface 156 of the pressure side and the surface 154 of the trailing edge are situated at a distance B from the trailing edge 142 that is constant or substantially constant.

Nevertheless, it is found that such ribs are not effective in stabilizing the position of the trailing edge of the blade; in operation harmful deformation of the blade is observed, in particular in the vicinity of the trailing edge and in the curved connection fillet between the blade and the platform. The temperature gradient that exists between the pressure-side and the suction-side walls of the blade gives rise to non-linear movements in a direction that is substantially perpendicular to the trailing edge.

Furthermore, in spite of the ribs, the trailing edge of the blade continues to be a zone of weakness of the blade, where cracks can appear because of the very high thermomechanical stresses that occur therein operation. Such cracks lead naturally to the blade failing more or less rapidly. Because of this potential for the appearance of faults, the trailing edge is thus found to be a factor that limits the average lifetime of blades.

OBJECT AND SUMMARY OF THE INVENTION

A first object of the invention is to define a turbomachine blade having ribs formed in the vicinity of its trailing edge, which blade is easy to fabricate industrially and does not present the above-mentioned drawbacks.

This object is achieved by the fact that over the major fraction of the trailing edge, in zones where the temperature in operation is particularly high, the ends of the ribs are closer to the trailing edge, and/or the sections of the ribs are greater.

Accordingly, the ribs provide more or less strength as a function of the local temperature of the blade in operation, as the ribs extend a greater or lesser distance towards the trailing edge, or as the ribs are of different sections.

It is found that temperature is the main parameter governing the way the trailing edge deforms, because of thermal expansion and also because of the stresses generated within the material. The main function of the ribs is thus to stiffen the trailing edge so as to stabilize its position. The ribs thus contribute to reducing the levels of stress in the material. By varying the strength of the ribs as a function of this temperature parameter, it is possible to optimize the design of the blades, so as to enable them to be stabilized without excessive degradation of their aerodynamic properties.

The local temperature in operation of the blade is the first parameter that needs to be taken into account when dimensioning the ribs in the vicinity of the trailing edge. Nevertheless, other parameters can also be taken into account, sometimes leading to dimensioning rules being adopted for some of the ribs other than those specified above.

In one embodiment, over the major fraction of the trailing edge, the strength of the ribs is increased in the vicinity of the trailing edge in zones where the temperature of the blade in operation is particularly high. Thus, the trailing edge is stiffened in hotter zones, while in cooler zones it is not stiffened, thereby enabling the number and the strength of the ribs to be minimized while nevertheless being sufficient to stiffen the trailing edge and prevent it from deforming.

In one embodiment, over the major fraction of the trailing edge, the ends of the ribs are closer to the trailing edge in zones where the temperature in operation is particularly high.

The trailing edge proper is the most critical zone: that is where the wall of the airfoil is thinnest and where the risk of deformation is greatest. By extending the ribs to the vicinity of the trailing edge preferentially in the hotter zones, the trailing edge is stiffened without needlessly harming the aerodynamic qualities of the blade.

In one embodiment, over the major fraction of the trailing edge, the ribs are closer to one another in zones in which the temperature in operation is particularly high. This embodiment serves to increase the stiffening effect of the ribs without it being necessary to give them a greater section or a greater length to bring their ends closer to the trailing edge. This enables stiffening to be obtained without pointlessly penalizing the aerodynamic qualities of the blade.

In an embodiment, over the major fraction of the trailing edge, the ribs are of section that is greater in zones where the temperature in operation is particularly high. Ribs of large section provide the trailing edge with bending strength that is considerably greater than that provided by ribs of smaller section.

It should also be observed that in the embodiments described above, it is stated how to increase the stiffness of a hot zone of the trailing edge of the blade. Naturally, inverse dispositions could be used to avoid pointlessly stiffening cooler zones of the trailing edge of the blade.

In one embodiment of the invention, where the blade includes a platform, the blade has a set of short ribs in the vicinity of the platform. It has been found that stresses are often concentrated in the trailing edge of a blade in the vicinity of its platform. In order to limit these stresses it is advantageous to provide short ribs in the vicinity of the platform, e.g. a first rib that is short or even a first two or three ribs that are shorter than the others.

A second object of the invention is to remedy the above-mentioned drawbacks by defining a high-pressure turbine for a turbomachine that includes at least one blade in accordance with any one of the above-described embodiments.

BRIEF DESCRIPTION OF THE DRAWINGS

The invention can be well understood and its advantages appear better on reading the following detailed description of embodiments given as non-limiting examples. The description refers to the accompanying drawings, in which:

FIGS. 2 and 3 are fragmentary face views of a turbomachine blade presenting ribs arranged on their trailing edges, respectively in accordance with the prior art and in accordance with the invention;

FIG. 4 is a curve plotting temperature along the trailing edge of a turbomachine blade as shown in FIG. 3; and FIG. 5 shows various possible sections for the ribs of a turbomachine blade in accordance with the invention.

MORE DETAILED DESCRIPTION

Figure 1:
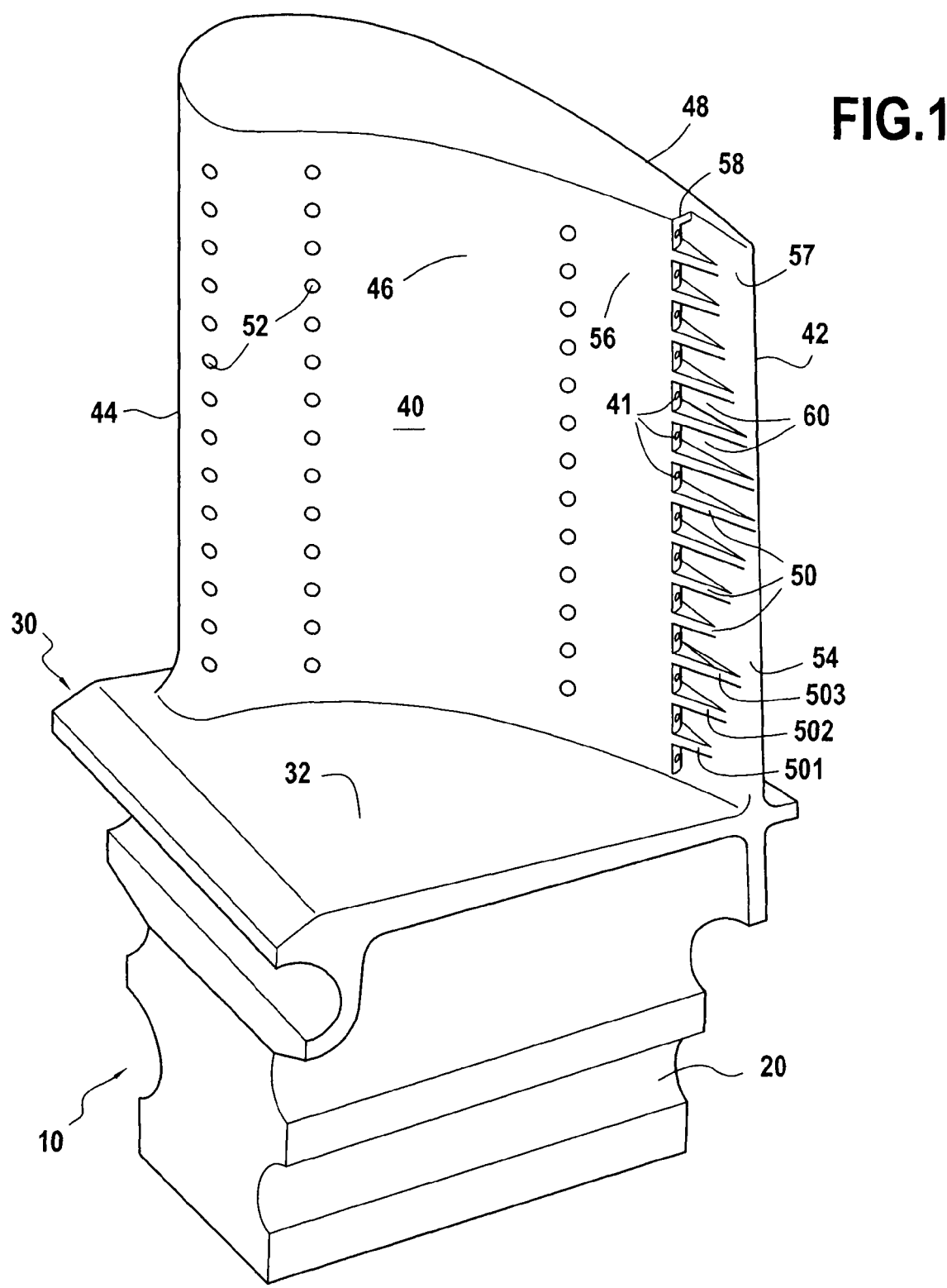
FIG. 1 is a perspective view of a turbomachine blade in accordance with the invention.

With reference to FIG. 1, there follows a description of a turbomachine blade in accordance with the invention.

The blade 10 comprises a root 20, a platform 30, and an airfoil 40. The airfoil 40 extends between a pressure side 46 and a suction side 48. These are interconnected via a leading edge 44 and a trailing edge 42. The airfoil also has internal ducts for injecting air, which ducts open out via holes 52. These ducts serve to deliver cool air to the blade in order to prevent its temperature from rising, in order to cool it, and thus enable it to be used even within a stream of gas at extremely high temperatures.

At the trailing edge, the pressure-side and the suction-side surfaces come together to form a wall 54 of small thickness. This wall 54 is stiffened by ribs 50. These ribs are formed on the pressure side.

The shape of the pressure side 46 in the vicinity of its trailing edge 42 is as follows. The pressure side has a main surface 56 of a shape that is generally rounded and regular. This main surface of the pressure side is interrupted by a step 58, and it is extended downstream from the step 58 by a surface 57 that is the surface of the wall 54 situated on the pressure side. The ribs 50 extend from said step 58 to the wall 54. Slots 60 are left between consecutive ribs. Advantageously, air injection holes 41 are formed in said slots 60 and serve to cool the trailing edge 42.

With reference to FIGS. 3 and 4, the operation and the disposition of the ribs in the FIG. 1 turbomachine blade are described below in detail. The airfoil 40 of the turbomachine blade 10 shown in FIG. 3 has a set of ribs 50 that are substantially parallel to the top face 32 of the platform 30 of the blade 10. These ribs 50 serve to stiffen the wall 54 of the trailing edge of the airfoil 40. Going from their upstream ends, the ribs 50 extend from the step 58 between the main surface 56 of the pressure side and the surface 57 of the trailing edge of the airfoil.

In FIG. 3, the step 58 is shown as being at a substantially constant distance C from the trailing edge 42. More generally, said distance C between the step 58 and the trailing edge 42 can vary, e.g. as a function of the distance between the rib and the top surface 32 of the platform 30.

Furthermore, the ends 53 of the ribs 50 in the vicinity of the trailing edge are situated at different distances $D_i$ from the trailing edge 42 (to simplify the figure, not all of the distances $D_i$ are marked). These distances $D_i$ can be assessed by comparing them with the temperature profile shown in FIG. 4. FIG. 4 plots a curve representing variation in the local temperature $T°$ of the trailing edge of the blade as a function of distance X from the blade platform. Comparing FIGS. 3 and 4 show that where the temperature $T°$ close to the trailing edge is higher, the ends 53 of the ribs are closer to the trailing edge, so as to stiffen the trailing edge more in its hot zones.

For example, in the portion of the blade situated at a distance X0 from the platform 32, as shown in FIG. 4, the temperature curve passes through a local maximum. To stiffen the trailing edge in this high-temperature zone, the ribs in this zone are particularly long and extend substantially all the way to the trailing edge, i.e. more exactly the distance between the ends of the ribs and the trailing edge is minimized, as can be seen in FIG. 3.

Conversely, in the cooler zones, the ribs 50 may have their ends 53 situated at some greater distance from the trailing edge: this applies for example when observing the portion of the airfoil 40 that is situated at a distance X1 from the platform 32. At this level, the temperature curve passes through a minimum; correspondingly the distance between the trailing edge and the ends of the ribs in the vicinity of the trailing edge is increased, and in this example passes through a maximum.

Nevertheless, it should be observed that the above-mentioned correlation between the distances of the ends of the ribs and the trailing edge with the local temperature of the trailing edge of the blade is not necessarily the only parameter that needs to be taken into account when determining the distance that there needs to be between the ends of the blades and the trailing edge.

For example, as can be seen in FIG. 1, it is possible to decide to give more weight to some other criterion locally, and for example, in the vicinity of the platform, to reduce the length of the ribs locally (ribs 501, 502, and 503) so that they come to an end at a certain distance from the trailing edge so as to ensure that it has flexibility in the vicinity of the platform. This flexibility is found to be particularly useful at this position along the trailing edge because of the high concentration of stresses that occurs in this position.

FIG. 5 shows various rib profiles that can be used in a blade of the invention. The line referenced E correspond to ribs all having the same section and spaced apart regularly. This corresponds to one possible embodiment of the invention in which the strengths of the ribs are adapted solely by varying the distances between the ends of the ribs and the trailing edge. It can be seen that each rib, taken individually, may present a section with corners that are sharp or rounded to a greater or lesser extent.

The line referenced F corresponds to ribs of sections that vary as a function of the temperature profile, the sections being greater in the higher temperature zones (e.g. at the point X0) and smaller in the lower temperature zones (e.g. at the point X1).

The line referenced G corresponds to ribs in which the spacing between consecutive ribs varies as a function of the temperature profile, the ribs being closer together in the higher temperature zones (e.g. at the point X0), and being further apart from one another in the lower temperature zones (e.g. at the point X1).

The various combinations described above can naturally be combined with one another.

What is claimed is:

1. A turbomachine blade comprising:
ribs formed on a pressure side of said blade in the vicinity of a trailing edge of said blade,
wherein over a major fraction of the trailing edge, in zones where the temperature in operation is particularly high, ends of the ribs are closer to the trailing edge and/or the sections of the ribs are greater.

2. A blade according to claim 1, wherein over the major fraction of the trailing edge, the strength of the ribs is increased in the vicinity of the trailing edge in zones where the temperature of the blade in operation is particularly high.

3. A blade according to claim 1, including a platform, and having a set of short ribs in the vicinity thereof.

4. A blade according to claim 1, in which slots are left between consecutive ribs with air injection holes being formed in said slots.

5. A turbomachine high-pressure turbine including at least one blade according to claim 1.

6. A turbomachine including at least one blade according to claim 1.

7. A blade according to claim 1, wherein said blade has a main surface on a majority of said pressure side, said main surface extending from a leading edge of said blade toward said trailing edge, said main surface being interrupted at a step, wherein said main surface is free of said ribs, and wherein said ribs extends from said step toward said trailing edge.

8. A blade according to claim 7, wherein said ribs extend from said step toward said trailing edge along variable lengths, wherein a plurality of said ribs extends substantially to the trailing edge and another plurality of ribs are substantially shorter.

9. A blade according to claim 8, wherein said blade has a temperature profile that varies along said trailing edge, and the lengths of said ribs are a function of said temperature profile.

10. A blade according to claim 9, wherein said ribs have a same section and are spaced apart regularly along said trailing edge.

11. A blade according to claim 7, wherein said ribs have different sections, wherein a plurality of said ribs having a relatively great section and another plurality of ribs have a relatively small section.

12. A blade according to claim 11, wherein said blade has a temperature profile that varies along said trailing edge, and the sections of said ribs are a function of said temperature profile.

13. A blade according to claim 7, wherein said ribs are spaced apart over different distances, wherein a plurality of said ribs are relatively close to each other and another plurality of ribs are relatively far apart from each other.

14. A blade according to claim 13, wherein said blade has a temperature profile that varies along said trailing edge, and the distances between each rib is a function of said temperature profile.

* * * * *